Feb. 10, 1942.    S. GILBERT    2,272,554

MACHINE BEARING

Filed April 17, 1940

INVENTOR.
Samuel Gilbert
BY Martin J. Finnegan
ATTORNEY.

Patented Feb. 10, 1942

2,272,554

UNITED STATES PATENT OFFICE 2,272,554

MACHINE BEARING

Samuel Gilbert, Verona, N. J., assignor to Bendix Aviation Corporation, South Bend, Ind., a corporation of Delaware Application April 17, 1940, Serial No. 330,211

2 Claims. (Cl. 308—187)

This invention relates to machine bearings, and particularly to the lubrication thereof.

An object of the invention is to improve the construction of machine bearings.

A further object of the invention is to provide a novel method of applying lubrication to a shaft bearing.

An additional object is to provide an improved shaft bearing characterized by the provision of lubricating means for association therewith in such manner as to assure continuous lubrication of the bearing regardless of the speed of operation of the associated shaft.

These and other objects of the invention will become apparent from inspection of the following specification when read with reference to the accompanying drawing wherein.

Figure 1:
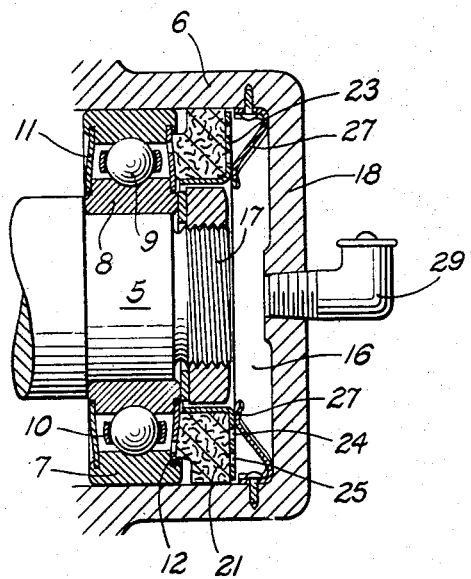
Fig. 1 is a sectional view of the invention as embodied in a shaft bearing.

In the drawing, the invention is shown applied to a shaft 5 rotatable within a housing 6 containing a ball-bearing assembly including an outer race 7, an inner race 8, a plurality of balls 9, in a cage or retainer 10, and laterally disposed annular plates 11 and 12 closing the ball-receiving space between the inner and outer races 8 and 9, respectively.

Figure 2:
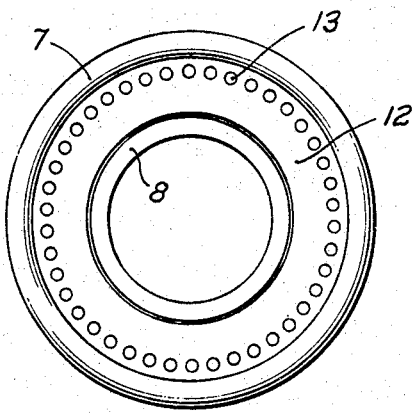
Fig. 2 is a side view of the bearing of Fig. 1.

As shown more clearly in Fig. 2, the annular plate 12 has a circular row of perforations 13 in communication with the ball-receiving space of the bearing assembly, and these openings 13 serve to conduct lubricating oil to the said ball-receiving chamber, the source of oil being the end space 16 located between the threaded end 17 of the shaft 5 and the end wall 18 of the housing. Within this space 16 there is provided an annular pad 21 of felt or equivalent absorbent material through which oil may pass by capillary action, thereby providing a continuous path for oil delivery from the end space 16 to the ball-receiving chamber. If desired, the pad 21 may have associated therewith an outer supporting plate, as at 23, the said plate being suitably apertured (as indicated at 24 and 25) to permit passage of oil to the pad from the free portion of the space 16. Alternatively, the felt or pad can be its own reservoir.

In order to facilitate and accelerate the capillary action resilient means—herein shown as a plurality of spring fingers 27—may be provided to yieldably urge the pad 21 into firmer contact with the bearing plate 12 by shifting the entire pad to the left, as a unit, thus taking up any clearance or play as between the pad, on the one hand, and the plate 12 on the other, but without necessarily effecting any appreciable compression of the pad material itself. This laterally applied pressure has the additional advantage of resisting any tendency for the oil to seep from the ball-receiving chamber of the bearing, and this pressure applied to the pad 21 thereby assures maintenance of lubrication continuously to all surfaces of the ball assembly. Any suitable means may be provided—as for example, the oil cup indicated at 29—for replenishing the supply of oil in the space 16, or for refilling thereof after disassembly and reassembly of the parts.

While the invention is shown in the drawings as applied to a bearing of the radial ball type, it will be obvious that the invention is equally applicable to other types of bearing requiring constant lubrication, and is particularly advantageous in high speed installations where the high speed tends to divert the oil from the bearings and thereby produce a dangerous condition, the correction of which is assured by the present invention. Moreover, the pad 21 permits maintenance of oil lubrication in all positions, independently of any additional reservoir.

In fact, one of the advantages of the present invention lies in the fact that the pad 21 will catch all oil escaping around the edges of the plate 12, and lead such oil back into the ball chamber, by the capillary action directed toward the openings 13. Thus the same quantity of oil may be constantly circulated in and out of the ball chamber, thereby rendering it unnecessary to add to the oil supply at frequent intervals.

What is claimed is:

1. The combination with a bearing assembly, including inner and outer races and an annular perforated plate interposed therebetween, of means including an absorbent pad for maintaining lubricant on the surface of said plate adjacent the perforations therein, to facilitate passage of lubricant through said perforations, and thus into the space between said inner and outer races, said lubricating means further including an oil chamber and a second annular perforated plate interposed between said oil chamber and the outer surface of said pad; the perforations in said second annular plate being located at diametrically opposite points thereon to provide constant direct access of oil to said outer annular surface at widely separated points thereon.

2. The combination with a bearing assembly, including inner and outer races, of means including an annular absorbent pad for maintaining lubricant on the surfaces of said races, said means further including resilient means for yieldably urging said pad against said bearing assembly.

SAMUEL GILBERT.